United States Patent [19]
Thompson et al.

[11] 4,201,447
[45] May 6, 1980

[54] TERMINATION FOR GRADED INDEX FIBER

[75] Inventors: George H. B. Thompson; Peter R. Selway, both of Sawbridgeworth, England

[73] Assignee: International Standard Electric Corporation, New York, N.Y.

[21] Appl. No.: 918,994

[22] Filed: Jun. 26, 1978

[30] Foreign Application Priority Data
Jul. 21, 1977 [GB] United Kingdom ............... 30647/77

[51] Int. Cl.² ................................................. G02B 5/14
[52] U.S. Cl. .............................. 350/96.31; 350/96.20; 350/96.15
[58] Field of Search ............... 350/96.20, 96.18, 96.15, 350/96.30, 96.31; 250/199, 227

[56] References Cited
U.S. PATENT DOCUMENTS

| | | | |
|---|---|---|---|
| 3,780,295 | 12/1973 | Kapron et al. | 350/96.15 |
| 3,808,549 | 4/1974 | Maurer | 350/96.20 |
| 3,832,028 | 8/1974 | Kapron | 350/96.31 |
| 3,894,789 | 7/1975 | Kobayashi et al. | 350/96.31 |

Primary Examiner—Rolf G. Hille
Attorney, Agent, or Firm—John T. O'Halloran; Peter C. Van Der Sluys

[57] ABSTRACT

A short length of step index fibre is placed in front of graded index fibre. Walls of the step index fibre form multiple images of its entrance face which are imaged by the graded index fibre to give a more nearly uniform illumination of the graded index fibre and thereby avoid the variable loss properties which can result from the repetitive focusing produced by point illumination or well collimated illumination.

9 Claims, 7 Drawing Figures

TERMINATION FOR GRADED INDEX FIBER

This invention relates to launching light into graded index optical fibre.

According to the present invention there is provided a graded index optical fibre terminating in a coupling piece of step index fibre whose numerical aperture is matched with or greater than that of the graded index fibre, wherein the cores of the abutting ends of said fibres have matching cross-sections, and wherein the length of the coupling piece of step index fibre is at least that at which the calculated lateral spacing of the first images in the graded index fibre of the remote end of the step index fibre is matched with or smaller than the maximum detail observable in the highest propagating mode of the step index fibre.

Figure 1:
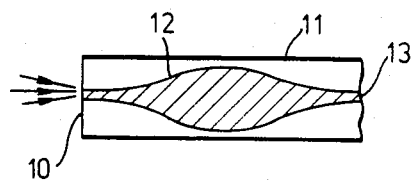
Figure 2:
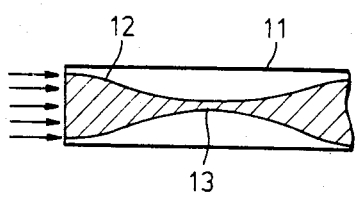
Figure 3:
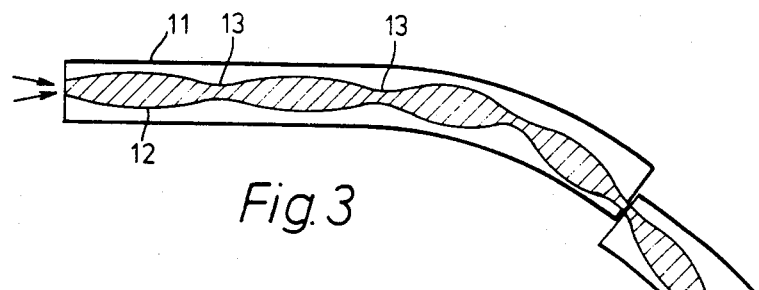
Figure 4:
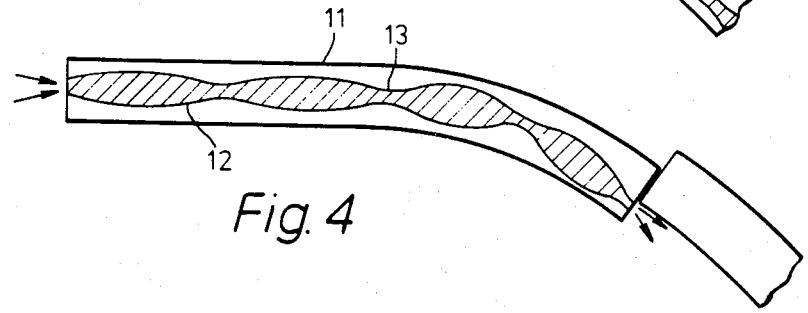
Figure 5:
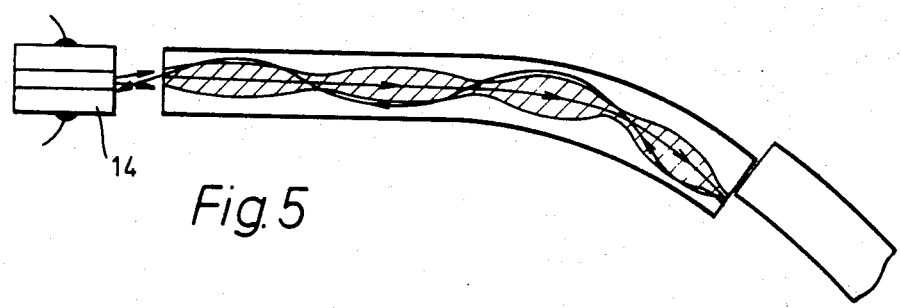
Figure 6:
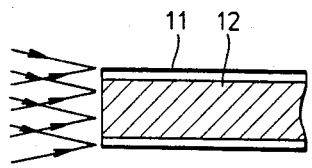
Figure 7:
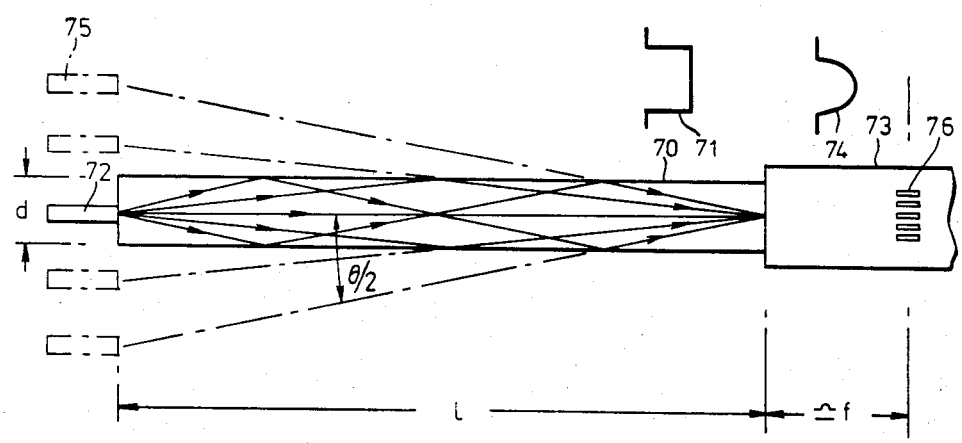

There follows a description of an embodiment of the invention together with a description of the background thereto. The description refers to the accompanying drawings in which:

FIG. 1 depicts the propagation of light in a graded index fibre when the light is launched into it through only a small proportion of the cross-sectional area of the core at the launching end, FIG. 2 depicts the propagation of light in the fibre when the light is launched as a well collimated beam, FIGS. 3, 4 and 5 depict the effects of a misaligned joint following a bend in the fibre when light is launched into the fibre under the launching conditions of FIG. 1 or 2, FIG. 6 depicts the propagation of light in the fibre when divergent light is launched into it over substantially the whole of the cross-sectional area of its core at the launching end, and FIG. 7 depicts the effect of introducing a short length of step index fibre in front of the graded index fibre.

The precise conditions under which light is launched into a graded index fibre can affect the propagation over a considerable distance from the launching point. In a fibre where there is little mode-mixing the distance concerned may be one km or more. Both the angular distribution and the spatial distribution of the light caused to impinge on the input face of the fibre have to be considered. If the input face 10 of a graded index fibre 11 is illuminated over a small area, as illustrated in FIG. 1, or if it is illuminated by a uniform beam of small angular divergence as illustrated in FIG. 2, than a structured beam 12 can be generated in the fibre which is repeatedly refocussed 13 as it propagates. If the area of illumination is off-centre or if the incident uniform parallel beam is directed at a small angle to the axis then the generated beam snakes from side to side of the fibre. This behaviour continues a distance down the fibre which is effectively determined by the aberrations of the self-focussing system.

FIG. 3 shows how bending of the fibre can cause an axial beam to start snaking. It also shows how sensitive is the effect of any defects or discontinuities which happen to coincide with the focus points of the beam. For instance the exact location of a misalignment in a fibre connection relative to the local beam position can exert a very considerable effect on the transmission coefficient of the connection concerned. In the situation in FIG. 3 the transmission is virtually complete whereas in that shown in FIG. 4 the majority of the light leaves the core of the fibre and enters the cladding. Such a change in behaviour could be produced simply by reversing the direction of bending. FIG. 5 shows that associated with the poor transmission there could be appreciable reflection of the light in the form of a returning beam which might emerge at some specific point or with some specific angle at the input end of the fibre. When, as shown in FIG. 5, light from a laser 14 is launched into the fibre small changes in the position or the angle can alter considerably the proportion of light impinging back on the laser, hence altering the feedback and the conditions of the laser oscillation. In all cases slight changes in the launching conditions, slight changes in the straightness of the fibre and slight changes in the focal length of the fibre (as might arise due to change in the wavelength of the laser emission) can alter the transmission, the reflection and the laser feedback. Hence it is, in general, undesirable for the light to propagate in a beam which is repeatedly focussed to a diameter much smaller than the core diameter of the fibre.

FIG. 6 shows the desirable situation at the input of a fibre. The fibre is uniformly excited over approaching the full diameter of the core with a cone of input angles which fills the input aperture of the fibre. Under such circumstances no repeated focussing effects will be observed in the beam that is launched.

FIG. 7 shows a method, which is suitable in conjunction with a laser or other source, for achieving such a uniform launching condition. A length 1 of step index optical fibre 70 with a rectangular refractive index profile 71 is inserted between the non-uniform launching point, in this case a laser 72, and the graded index fibre 73 having the refractive index profile 74. This step index fibre 70 may be circular in cross section, although to illustrate the principle involved it is taken as being of rectangular cross section in FIG. 7. Light propagating down such a fibre will appear to come from a two dimensional array of laser images separated by the thickness d of the core (one line of these is illustrated at 75 in FIG. 7). The number of apparent images increases as the viewing point is moved down the fibre away from the laser, the total number always being contained within the cone angle $\theta$ accepted by the fibre. The half cone angle $\theta/2$ is indicated in FIG. 7. The first section of the graded index fibre focuses all these images at 76 at an approximate distance into the fibre of f, the focal length of the graded index fibre. The criterion of an adequate length of step index fibre is that this array of images 76 should be sufficiently closely spaced as to represent uniform illumination. The spacing of these images is approximately $d \cdot f/l$. Using the expression for f in terms of the refractive index profile $f = \pi d(\mu/8\delta\mu)^{\frac{1}{2}}$, and equating the maximum detail observable in the highest mode of the step index fibre, $(\lambda/(8\mu\delta\mu))^{\frac{1}{2}}$, to the spacing of the laser images, gives the minimum adequate length of step index fibre $l_o = \pi\mu d^2/\lambda$. In the case of a typical set of launching conditions $f = 1$ mm, $d = 50$ $\mu$m and $\lambda/\mu = 0.6$ $\mu$m gives $l_o = 1.3$ cms.

Hence, the length of step index fibre 70 inserted between the laser and the main transmitting fibre of graded index profile is typically made not shorter than about 2 cm. This fibre should have a numerical aperture at least as large as the numerical aperture of the graded index fibre and a core size sufficiently greater to ensure satisfactory alignment. The cross section may be circular. The fibre may be either parallel or tapered up in section from the laser to the graded index fibre, either with circular cross section or changing from elliptical to circular. The purpose of the inserted fibre is to provide more uniform illumination across the input face of the graded index fibre and hence to avoid situations which can discriminate against certain locations of a constricted guided beam within the graded index fibre, whether they be associated with the forward transmission of the wave or with the reflected component which may interact with the laser. Such lengths of fibre may usefully also be inserted between optical components in a fibre transmission line which can reintroduce localised illumination, such as connectors which are not adequately aligned etc, or between the fibre transmission line and an optical detector.

We claim:

1. A graded index optical fibre terminating in a coupling piece of step index fibre whose numerical aperture is matched with or greater than that wherein the cores of the abutting ends of said fibres have matching cross-sections, and wherein the length of the coupling piece of step index fibre is at least that at which the calculated lateral spacing of the first images in the graded index fibre of the remote end of the step index fibre is matched with or smaller than the maximum detail observable in the highest propagating mode of the step index fibre.

2. An optical fibre as claimed in claim 1 wherein the length of the coupling piece of step index fibre is at least 2 cm long.

3. An optical fibre as claimed in claim 1 wherein the cross-section of the coupling piece of step index fibre is substantially rectangular.

4. An optical fibre as claimed in claim 1 wherein the cross-section of the coupling piece of step index fibre is circular.

5. An optical fibre as claimed in claim 1 wherein the coupling piece of step index fibre is tapered.

6. An optical fibre as claimed in claim 1 wherein the cross section of the coupling piece of step index fibre changes from elliptical at one end to circular at the other.

7. A method of coupling a light source to a graded index fibre wherein a coupling length of step index fibre is inserted between the light source and the graded index fibre, wherein the abutting ends of said fibres have matching cross sections, wherein the numerical aperture of the step index fibre is matched with or greater than that of the light source, and wherein the length of the coupling piece of step index fibre is at least that at which the calculated lateral spacing of the first set of images in the graded index fibre of the remote end of the step index fibre is matched with or smaller than the maximum detail observable in the highest propagating mode of the step index fibre.

8. A method as claimed in claim 8 wherein the light source is a laser.

9. A method as claimed in claim 8 wherein the light source is the end of another optical fibre having light propagating therethrough.

* * * * *